(12) United States Patent
Cinti et al.

(10) Patent No.: US 10,014,714 B2
(45) Date of Patent: Jul. 3, 2018

(54) SYSTEM AND METHOD FOR UNINTERRUPTIBLE POWER SUPPLY INTELLIGENT TRANSFER

(71) Applicant: Chloride Srl, Castel Guelfo (IT)

(72) Inventors: Ugo Cinti, Calderara di Reno (IT); Guerino Vassallo, Castel Guelfo (IT); Marco Bonora, San Lazzaro di Savena (IT)

(73) Assignee: Vartiv S.R.L., Piove di Sacco (IT)

( * ) Notice: Subject to any disclaimer, the term of this patent is extended or adjusted under 35 U.S.C. 154(b) by 468 days.

(21) Appl. No.: 14/625,030

(22) Filed: Feb. 18, 2015

(65) Prior Publication Data

US 2015/0256029 A1    Sep. 10, 2015

Related U.S. Application Data

(60) Provisional application No. 61/948,051, filed on Mar. 5, 2014.

(51) Int. Cl.
*H02J 9/00* (2006.01)
*H02J 9/06* (2006.01)

(52) U.S. Cl.
CPC ............. *H02J 9/061* (2013.01); *H02J 9/062* (2013.01); *Y10T 307/615* (2015.04)

(58) Field of Classification Search
CPC ..................................... H02J 9/061
USPC .......................................... 307/64
See application file for complete search history.

(56) References Cited

U.S. PATENT DOCUMENTS

| 4,782,241 A | 11/1988 | Baker et al. |
| 5,790,391 A * | 8/1998 | Stich ............ H02J 9/062 307/64 |
| 6,466,465 B1 | 10/2002 | Marwali |
| 6,730,884 B2 | 5/2004 | Baker et al. |

(Continued)

FOREIGN PATENT DOCUMENTS

WO          9826488 A2      6/1998

OTHER PUBLICATIONS

International Search Report and Written Opinion issued in corresponding International Application No. PCT/IB2015/051249 dated Jul. 9, 2015, 11 pages.

*Primary Examiner* — Lincoln Donovan
*Assistant Examiner* — Metasebia Retebo
(74) *Attorney, Agent, or Firm* — Harness, Dickey & Pierce, P.L.C.

(57) ABSTRACT

A method is disclosed which makes use of an intelligent transfer algorithm for a UPS when the UPS is required to switch from a high efficiency mode of operation (VFD or VI) to an independent mode of operation (VFI), as a result of an under voltage condition occurring on the bypass line of the UPS. The method involves performing successive voltage measurements at a plurality of points during a first half cycle of an AC mains (Vout) signal to integrate the Vout signal until a zero crossing of the Vout signal is detected. Successive voltage measurements are used to detect the disruption of the Vout signal and a percentage of missing voltage area from the Vout signal during the disruption. The UPS then supplies a compensation voltage (Vcomp) which is added to the Vout signal to restore the Vout signal to a level at least approximately equal to a nominal AC mains voltage output signal ($Vout_{nominal}$).

17 Claims, 15 Drawing Sheets

(56) References Cited

U.S. PATENT DOCUMENTS

| | | | |
|---|---|---|---|
| 6,768,223 B2 | 7/2004 | Powell et al. | |
| 6,879,060 B2 | 4/2005 | Hohri | |
| 7,072,182 B2 | 7/2006 | Reichle et al. | |
| 7,459,804 B2 | 12/2008 | Marwali et al. | |
| 7,932,635 B2 | 4/2011 | Shenoy et al. | |
| 7,969,156 B2 | 6/2011 | Ferguson | |
| 8,063,671 B2 | 11/2011 | Xiao | |
| 8,416,592 B2 | 4/2013 | Zhang et al. | |
| 8,665,619 B2 | 3/2014 | Cui | |
| 8,699,253 B2 | 4/2014 | Zhang et al. | |
| 8,908,405 B2 | 12/2014 | Yang | |
| 9,000,613 B2 | 4/2015 | Shetler, Jr. et al. | |
| 2008/0278003 A1 | 11/2008 | Pouchet et al. | |
| 2011/0241430 A1 | 10/2011 | Liu et al. | |
| 2013/0049471 A1* | 2/2013 | Oleynik | H02J 3/01 307/65 |
| 2014/0132074 A1* | 5/2014 | Bush | H02J 9/06 307/66 |
| 2014/0132080 A1 | 5/2014 | Bush et al. | |

* cited by examiner

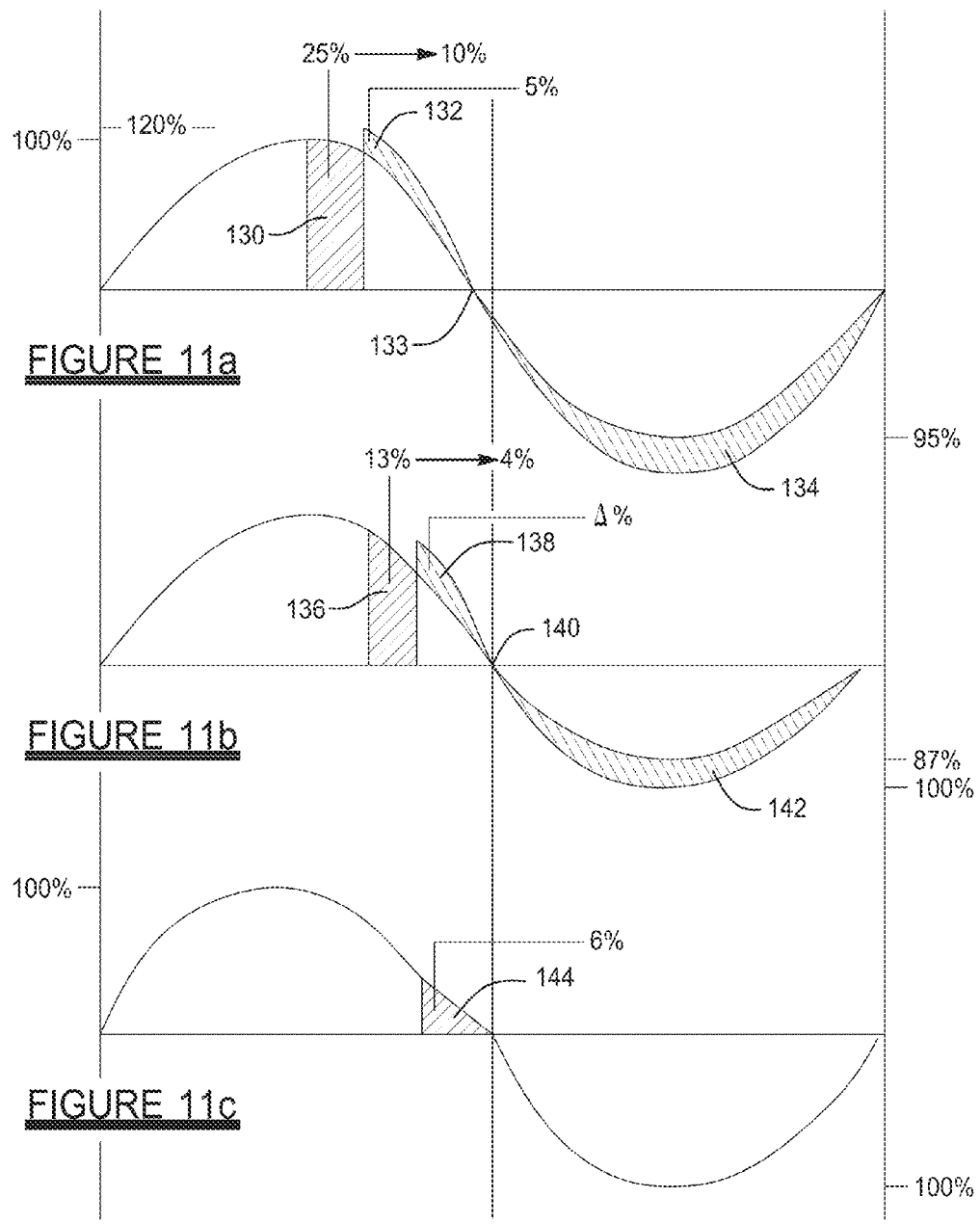

SYSTEM AND METHOD FOR UNINTERRUPTIBLE POWER SUPPLY INTELLIGENT TRANSFER

CROSS-REFERENCE TO RELATED APPLICATIONS

This application claims the benefit of U.S. Provisional Application No. 61/948,051, filed on Mar. 5, 2014. The entire disclosure of the above application is hereby incorporated herein by reference into the present disclosure.

FIELD

The present disclosure relates to uninterruptible power supplies (UPSs), and more particularly to a system and method for monitoring and managing a switchover from bypass to an inverter of a UPS when the UPS detects that power from an AC mains source suddenly is interrupted or lost, which would otherwise result in an in-rush of current to a transformer located downstream of the UPS, and where the in-rush of current may be of a level to significantly degrade the output of the inverter.

BACKGROUND

The statements in this section merely provide background information related to the present disclosure and may not constitute prior art.

Uninterruptible Power Supplies (UPS) are often integrated into a complex datacenter architecture which includes several devices such as transformers, static switch systems (STSs) and power distribution units (PDUs). The interaction among these and the necessity to operate in high efficiency modes may affect the overall reliability of a system. The assignee of the present application has experienced in the field that when a UPS system operating on a high efficiency mode (voltage independent (VI) or voltage-frequency dependent (VFD)) has a downstream transformer, fast voltage variations due to a low impedance fault on a bypass line of the UPS may cause an in-rush current on the primary side of the transformer during the transfer from VFD/VI mode to a voltage/frequency independent (VFI) mode, where the UPS is then providing power to the load.

Referring to FIG. 1, one example of a typical data center is shown to illustrate the above described challenge. The system in the example of FIG. 1 is comprised of n-UPSs (An) connected to Static Transfer Switches (Sn) and downstream transformers (Tn). Each UPS analyzes the main line and, based on this analysis, decides when it is possible to transfer the load to one of the following high efficiency modes: VI (Voltage independent) or VFI (Voltage Frequency Independent). In case of voltage fluctuations, dips or frequency shifting, the load is transferred on inverter (VFI). When the UPS works on VFI, the output is not affected by the main power distribution voltage variation. But the high efficiency modes VI and VFI, which are often termed "input dependent" modes, need a strong control to guarantee the quality and the reliability of the power being supplied.

FIG. 2 shows a graph that illustrates the limits that need to be respected during a transfer from input dependent modes to the VFI mode, for class 1 equipment during normal operation. By "normal operation" it is meant that input failures, such as shorts on the input line, are excluded. The UPS output voltage shall remain within FIG. 2 limits during change of mode of operation, linear or no-linear load steps. Deviations with respect to the nominal voltage which do not exceed 30% in amplitude for less than 5 ms, and which are less than 0.1 millisecond in duration, are not considered. FIG. 3 shows the relation between voltage, current and magnetic induction in a transformer at the instant the primary side is switched on after an interruption. FIG. 4 further shows a typical three phase voltage (in the three phases) and the real voltage when an input failure (low impedance) is applied. The above limits (FIG. 2) describe an AC input envelope which may be tolerated by Information Technology Equipment, the extent of this (envelope) is affected when the load is resistive-capacitive (leading power factor) or resistive-inductive (lagging power factor), or when non-linear loads are being handled, which are typical in modern day datacenters.

The assignee of the present application has developed a system involving a Fast Transfer Algorithm, for which U.S. Letters Patent has been applied for, that is an optimized solution to increase the reliability of the high efficiency modes (VFD and VI) of a UPS. However, when the architecture complexity of a data center increases due to other elements/components downstream of the UPS but upstream of the load, and a low impedance failure occurs, there is no guarantee that the above described voltage variation will be within the desired thresholds for Class 1 equipment.

The data center installation may also include other devices downstream of the UPS units (such as a Static Transfer Switch or transformer), and as such the modified fast transfer algorithm needs to be integrated with an advanced control (Intelligent Transfer) which also considers the presence of different types of equipment in the data center (e.g., static transfer switches and transformers), and the effects such equipment may have on the voltage variation when the UPS transfers to the VFI mode of operation. For example, in FIG. 1, with the STS present downstream of the UPS, the UPS shall not consider the few milliseconds load interruption which is naturally generated by the change of mode of operation in case of a low impedance failure. This means the STS control should be compatible with the FAST TRANSFER time (a few milliseconds) of the mode change over to properly operate in this kind of installation, but this is not always possible. So it is necessary to provide a control algorithm, which is integrated into the UPS, which can consider also the integration of other devices downstream of the UPS but upstream of the load, which may affect the amount of current that is provided to the load.

For a typical RL or RC load, variations of a few milliseconds (e.g., 3-4 milliseconds for fast transfer) cannot affect the UPSs. But if a transformer is fitted downstream of the UPS, the interruption in supply voltage can saturate the core of the transformer. This can generate a phenomenon well known in the industry as an "in-rush current." The in-rush current can produce a degradation of the VFD/VI mode (input dependents modes). FIG. 3 shows a typical dependence on the transformer primary side voltage variation (V), the magnetic induction ($B_m$) and the in-rush current ($i_{0max}$), which may be generated when the transformer is switched on. To summarize, the whole system reliability is not only based on the fast transfer in this situation, but it is also necessary to avoid having the inverter become overloaded by an in-rush current. This is because the inverter has a limited current handling capability. It is also necessary to keep in mind that a STS placed upstream could move the load on the second source before the UPS transfer algorithm has completed its operation.

FIG. 4 illustrates a typical example of a three phase low impedance fault, applied on the bypass line of a UPS. The in-rush current generated during this failure could be greater than the in-rush current at the first supply because, due to the residual induction, the maximum induction could be up to three times the nominal one, and can lead the inverter of the UPS in strong current limitation. This phenomenon can be avoided if, after the load interruption ($T_{transfer}$>1 ms) due to a low impedance fault, at the inverter startup the waveform generated by the inverter has an amplitude which is able to compensate in the first half cycle (i.e., first 10 ms) the voltage missing (area) from the point when the failure initially arises, up to the time that the change to the VFI mode of operation occurs.

SUMMARY

In one aspect the present disclosure relates to a method for detecting and compensating for an under voltage fault condition which arises when a low impedance fault occurs on a bypass line of an uninterruptible power supply (UPS) as a result of a disruption of an AC output mains (Vout) signal present on the bypass line, which reduces the Vout signal below a nominal AC mains voltage output (Vout$_{nominal}$), and wherein a component is disposed downstream of the UPS and receives power from the UPS as a changeover is made from a high efficiency mode of operation to a voltage/frequency independent (VFI) mode in which the UPS is supplying power to a load, and the component is upstream of the load but downstream of the UPS. The method may comprise performing successive voltage measurements at a plurality of points during a first half cycle of the Vout signal to integrate the Vout signal until a zero crossing of the Vout signal is detected. The method may also involve using the successive voltage measurements to detect the disruption of the Vout signal and a percentage of missing voltage area from the Vout signal during the disruption. The method may further involve using the UPS to supply a compensation voltage (Vcomp) which is added to the Vout signal to restore the Vout signal to a level at least approximately equal to Vout$_{nominal}$.

In another aspect the present disclosure relates to a method for detecting and compensating for an under voltage fault condition which arises when a low impedance fault occurs on a bypass line of an uninterruptible power supply (UPS) as a result of a disruption of an AC output mains (Vout) signal present on the bypass line, which reduces the Vout signal below a nominal AC mains voltage output (Vout$_{nominal}$), and wherein a component is disposed downstream of the UPS and receives power from the UPS as a changeover is made from a high efficiency mode of operation to a voltage/frequency independent (VFI) mode in which the UPS is supplying power to a load, and the component is upstream of the load but downstream of the UPS. The method may comprise setting a predetermined percentage voltage compensation threshold relating to a percentage of voltage that is lost during the disruption of the Vout signal, and below which no action will be taken to compensate for the disruption. The method may also involve performing successive voltage measurements at a plurality of points during a first half cycle of the Vout signal to integrate the Vout signal until a zero crossing of the Vout signal is detected. The method may further involve using the successive voltage measurements to detect the disruption of the Vout signal and a percentage of missing voltage area from the Vout signal during the disruption. The method may further involve determining if the percentage of missing voltage area from the Vout signal during the disruption has resulted in a percentage of voltage lost from the Vout signal that exceeds the predetermined percentage voltage compensation threshold. The method may then involve using the UPS to supply a compensation voltage (Vcomp) which is added to the Vout signal to restore the Vout signal to a level at least approximately equal to Vout$_{nominal}$.

In still another aspect the present disclosure involves a system having an intelligent transfer algorithm to detect and compensate for an under voltage fault condition which arises when a low impedance fault occurs on a bypass line of an uninterruptible power supply (UPS) as a result of a disruption of an AC output mains (Vout) signal present on the bypass line, which reduces the Vout signal below a nominal AC mains voltage output (Vout$_{nominal}$), and wherein a component is disposed downstream of the UPS and receives power from the UPS as a changeover is made from a high efficiency mode of operation to a voltage/frequency independent (VFI) mode in which the UPS is supplying power to a load, and the component is upstream of the load but downstream of the UPS. The system may comprise a UPS on which the intelligent transfer algorithm is running. The UPS may be configured to perform successive voltage measurements at a plurality of points during a first half cycle of the Vout signal to integrate the Vout signal until a zero crossing of the Vout signal is detected. The UPS may use the successive voltage measurements to detect the disruption of the Vout signal and a percentage of missing voltage area from the Vout signal during the disruption. The UPS may then supply a compensation voltage (Vcomp), which is added to the Vout signal to restore the Vout signal to a level at least approximately equal to Vout$_{nominal}$.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIGS. 11*a*-11*c* show three additional examples of how the voltage area compensation of the present disclosure may be applied in different scenarios;

DETAILED DESCRIPTION

Figure 1:
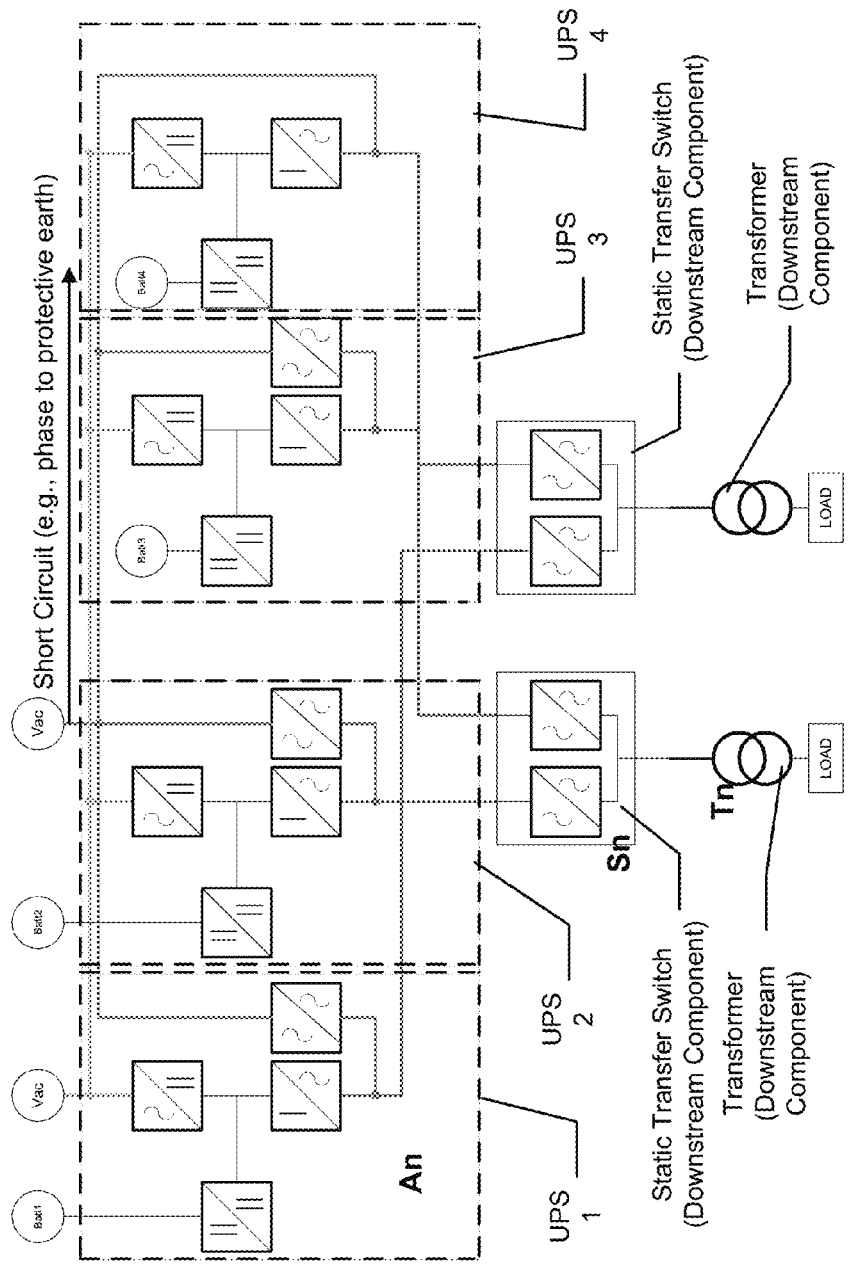
FIG. 1 is a high level block diagram schematic of a plurality of UPSs, static transfer switches and transformers that may be used in a typical data center configuration.
Figure 2:
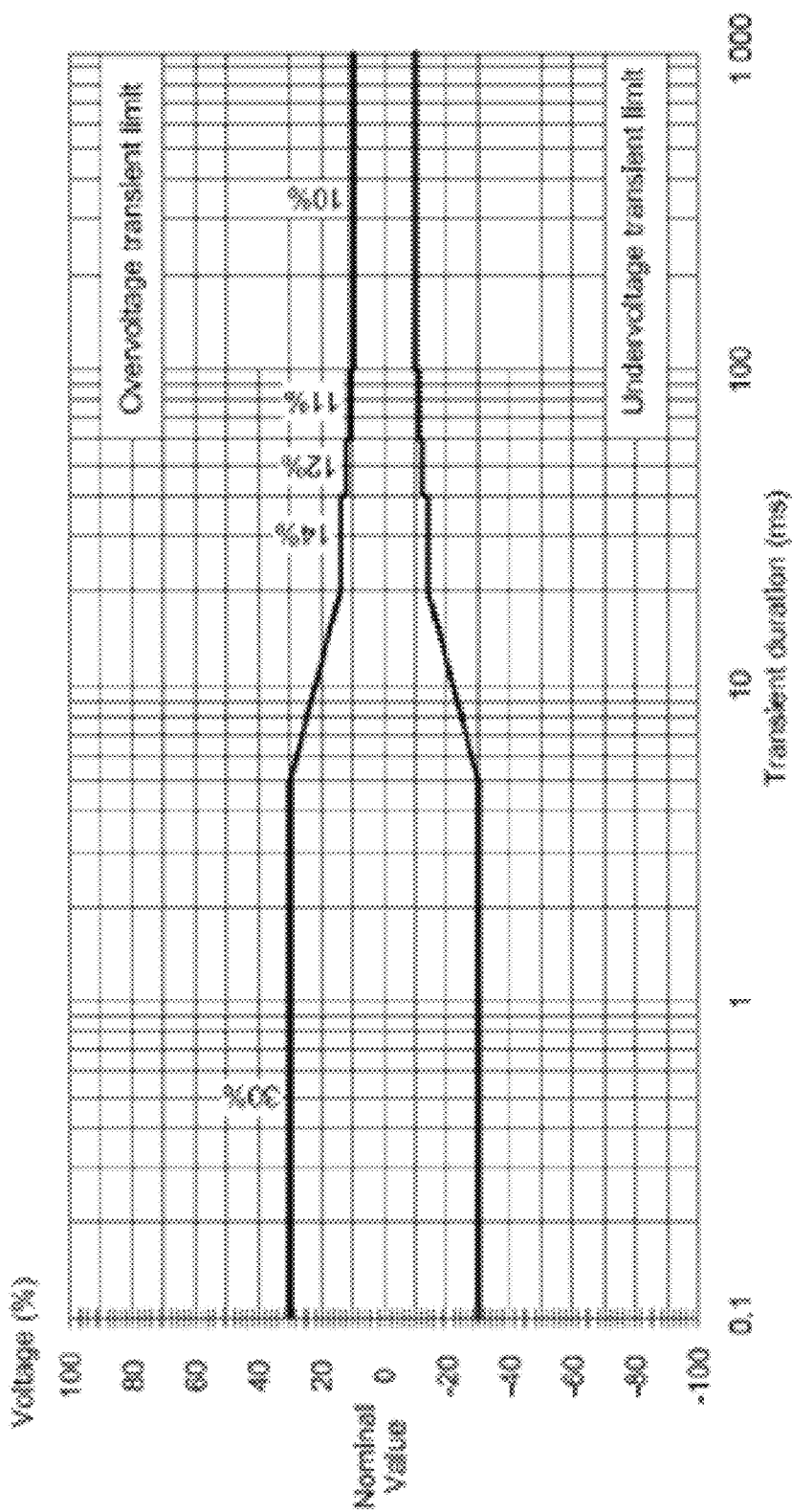
FIG. 2 is a graph illustrating the voltage limits within which the UPS1 output voltage needs to remain during a change of mode operation.
Figure 3:
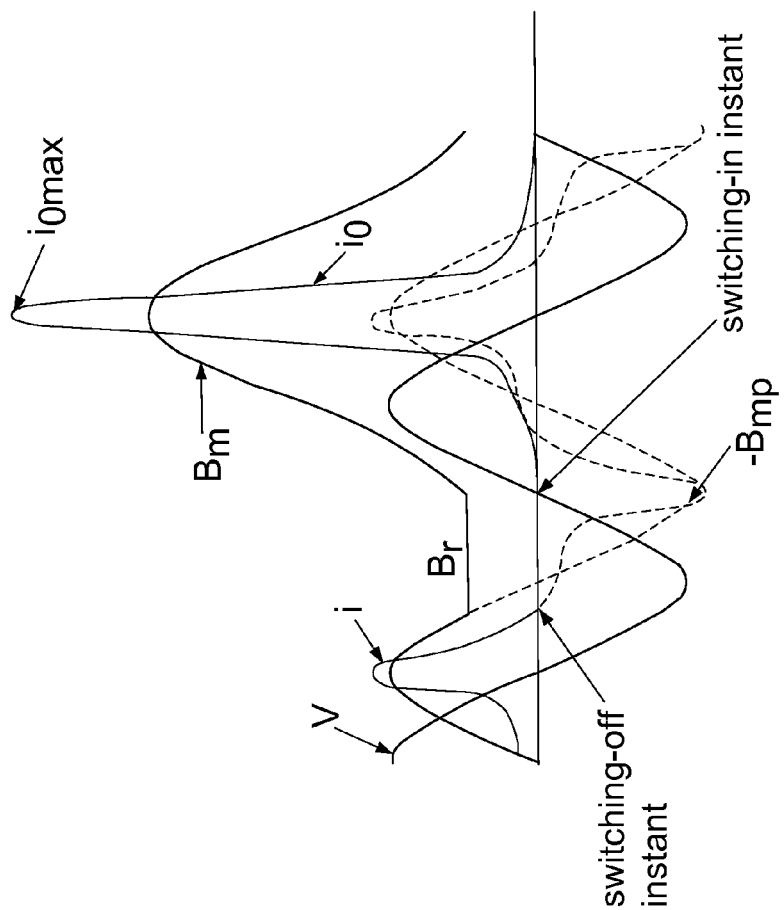
FIG. 3 illustrates the interaction on a transformer primary side between voltage, the magnetic induction and the in-rush current during the first few milliseconds after the transformer is switched from an off condition to an on condition.
Figure 4:
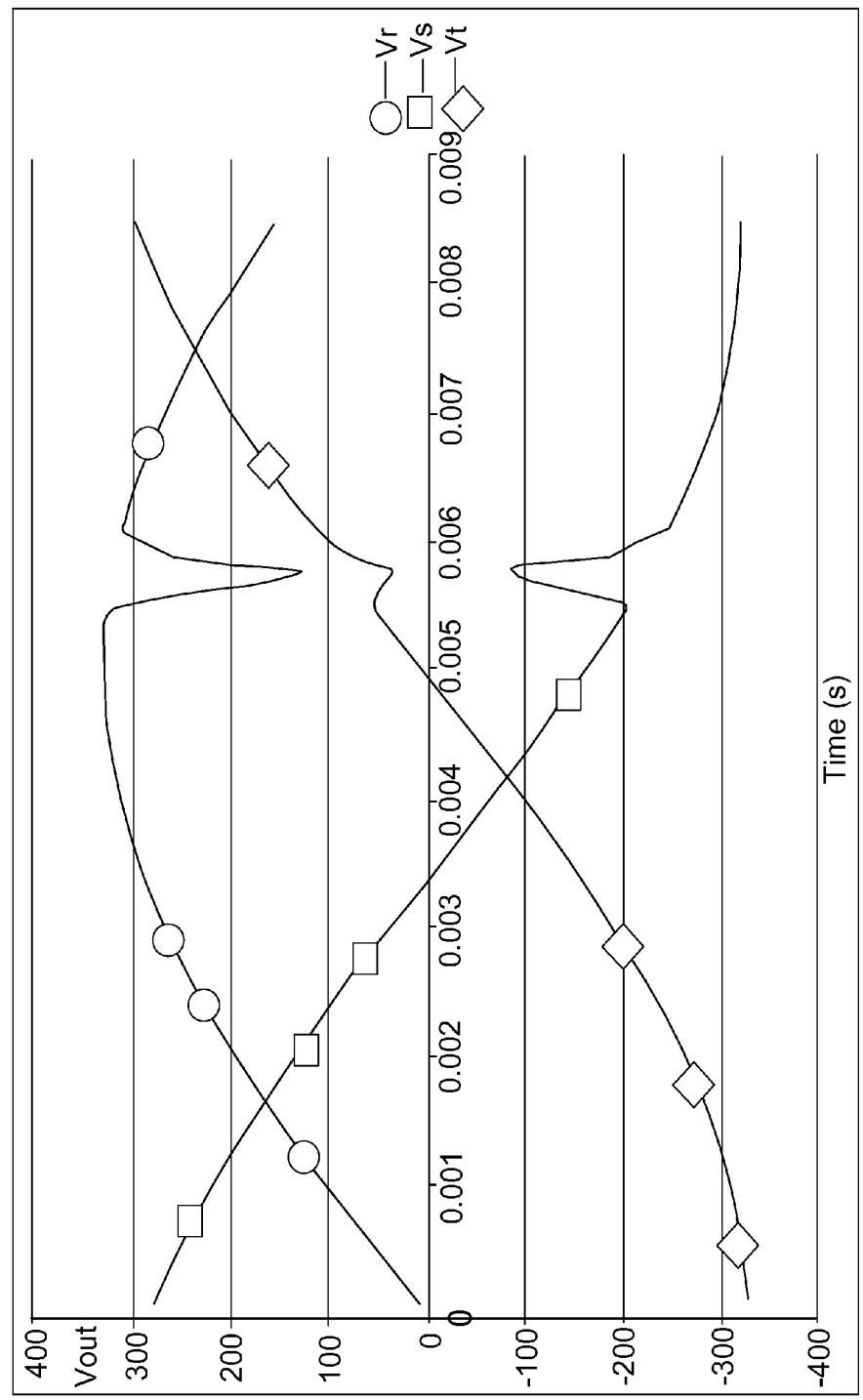
FIG. 4 is a graph showing under voltage conditions occurring on a three phase bypass line of a UPS.

The following description is merely exemplary in nature and is not intended to limit the present disclosure, application, or uses. It should be understood that throughout the drawings, corresponding reference numerals indicate like or corresponding parts and features.

Figure 5:
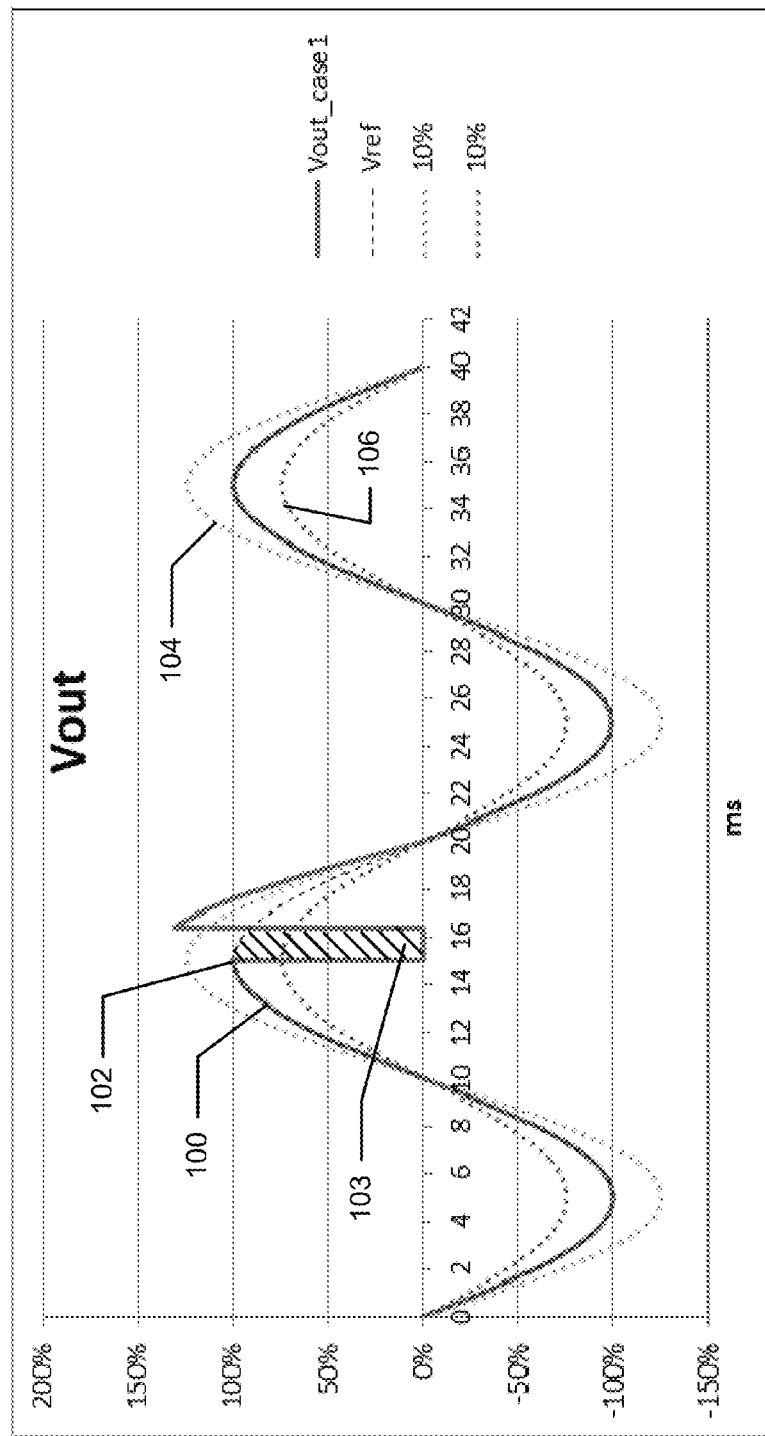
FIG. 5 is a graph illustrating the compensation applied on a phase after the voltage interruption, and in particular this is an example showing a compensation that can be applied within the same cycle as when the failure occurs.

FIG. 5 shows one example where a method in accordance with the present disclosure for implementing an intelligent transfer voltage compensation can be used to compensate for an under voltage fault condition in a data center during a fast transfer from a dependent mode of operation (VFD or VI) to an independent mode of operation (e.g., VFI by a UPS). For the first 15 ms of the Vout waveform 100 the load is on the bypass line of the UPS. At point 102 a fault arises and an under voltage condition occurs. The Vout waveform 100 represents the real output voltage, which is in accordance with the reference voltage (i.e., "Vref"). Vref also may be viewed as the Vout nominal in this example. The "+10%" and "−10%" waveforms 104 and 106 represent the +10% and −10% threshold limits, respectively, for compensation with respect to the operative windows of an STS that is present in the UPS. Put differently, the +10% and −10% waveforms 104 and 106 represent the maximum and minimum instantaneous voltage thresholds within which any compensation applied by the method of the present disclosure should stay within. In this example the voltage thresholds provided by the waveforms 104 and 106 represent the AC voltage envelope that Vout must be maintained within. In this example cross hatched area 103 represents the "missing" voltage area that needs to be compensated for. The method, making use of the intelligent algorithm, integrates the area under the waveform 102 to determine the "missing" voltage for area 103. If this exceeds 15%, which is the threshold selected in this example that corresponds to the tolerance of the transformer which is present downstream of the UPS, then voltage area compensation is required. In this example voltage area compensation is required.

Figure 6:
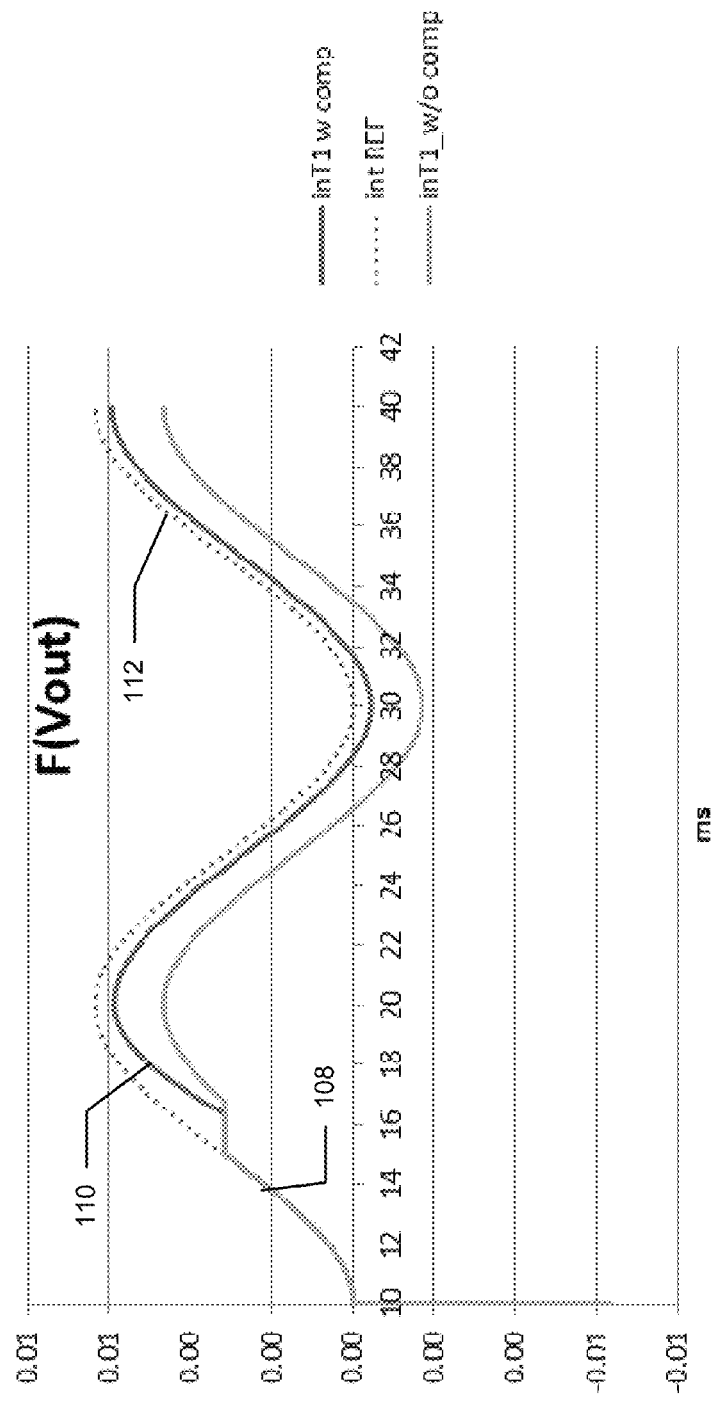
FIG. 6 is a graph showing the voltage area as processed by a processor (e.g., microprocessor, DSP, etc.), the voltage area, to clarify this graph is proportional to the integral of the voltage of FIG. 5. When the voltage is zero (FIG. 5 more or less at 15 ms) the voltage area becomes constant up to 17 ms more or less when the voltage is back)

FIG. 6 shows waveform 108, which is the Vout processed by a microprocessor of the UPS from FIG. 5. This is proportional to the $\int V_{out}$. Waveform 110 shows the voltage area in case compensation is applied after the failure. Waveform 112 represents the voltage area when the compensation is not applied. When one looks at the graph when the compensation is not applied, the mean value of this area does not come to zero at 30 ms. This condition generates the in-rush current. Instead, the waveform 110 is very close to zero, and the compensation permits the UPS to recuperate this gap. It will be noted that there is about a 2 ms time required for the fast transfer procedure to commutate to double conversion (i.e., VFI mode) and switch the inverter on. After this interval the needed voltage area compensation may begin (using the intelligent transfer algorithm). In the example of FIG. 6 it is possible to determine and provide the needed voltage area compensation within the first half cycle (i.e., by the 20 ms mark). The +10% and −10% limits represent the operative window of an STS placed upstream of the load, and thus are the instantaneous peak voltage limits that should not be exceeded when the voltage area compensation is applied, or which can only be exceeded for a short time interval.

Figure 7:
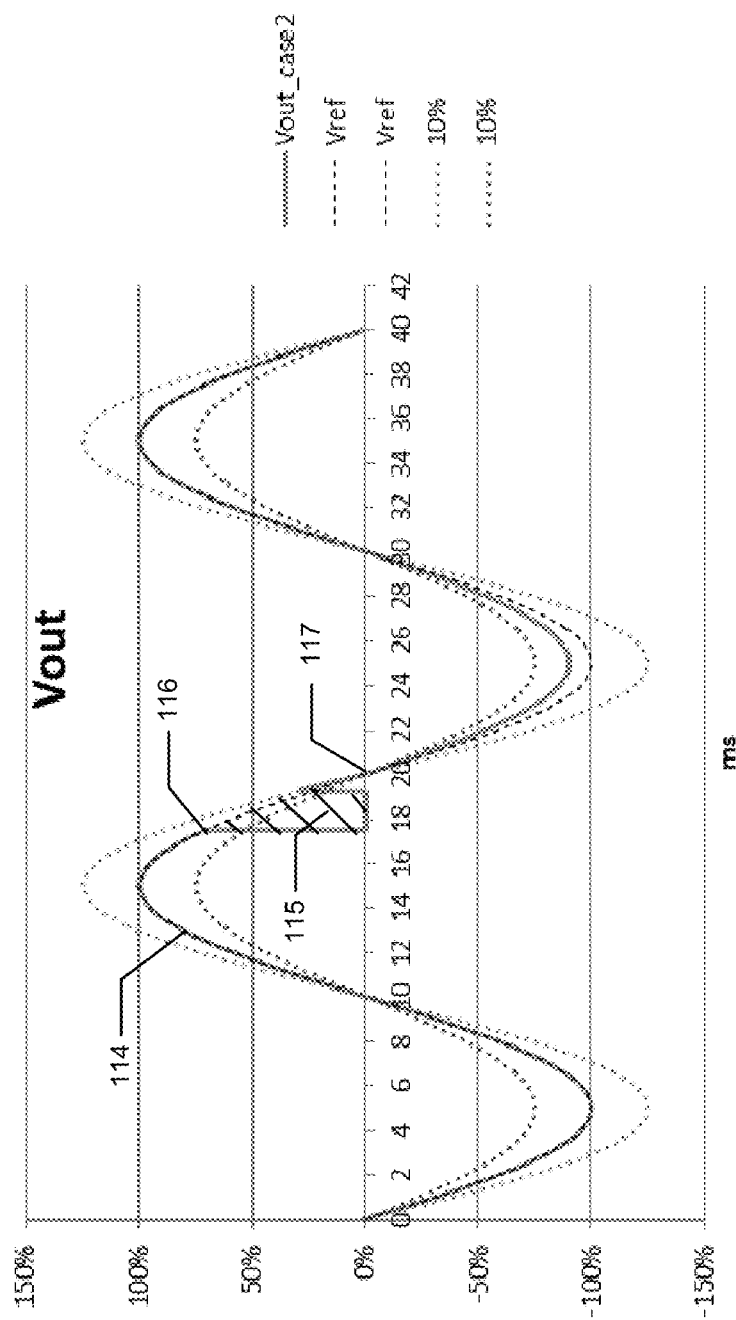
FIG. 7 is another use case showing an under voltage occurrence occurring close to the zero crossing so that compensation cannot be completely applied by the zero crossing point.
Figure 8:
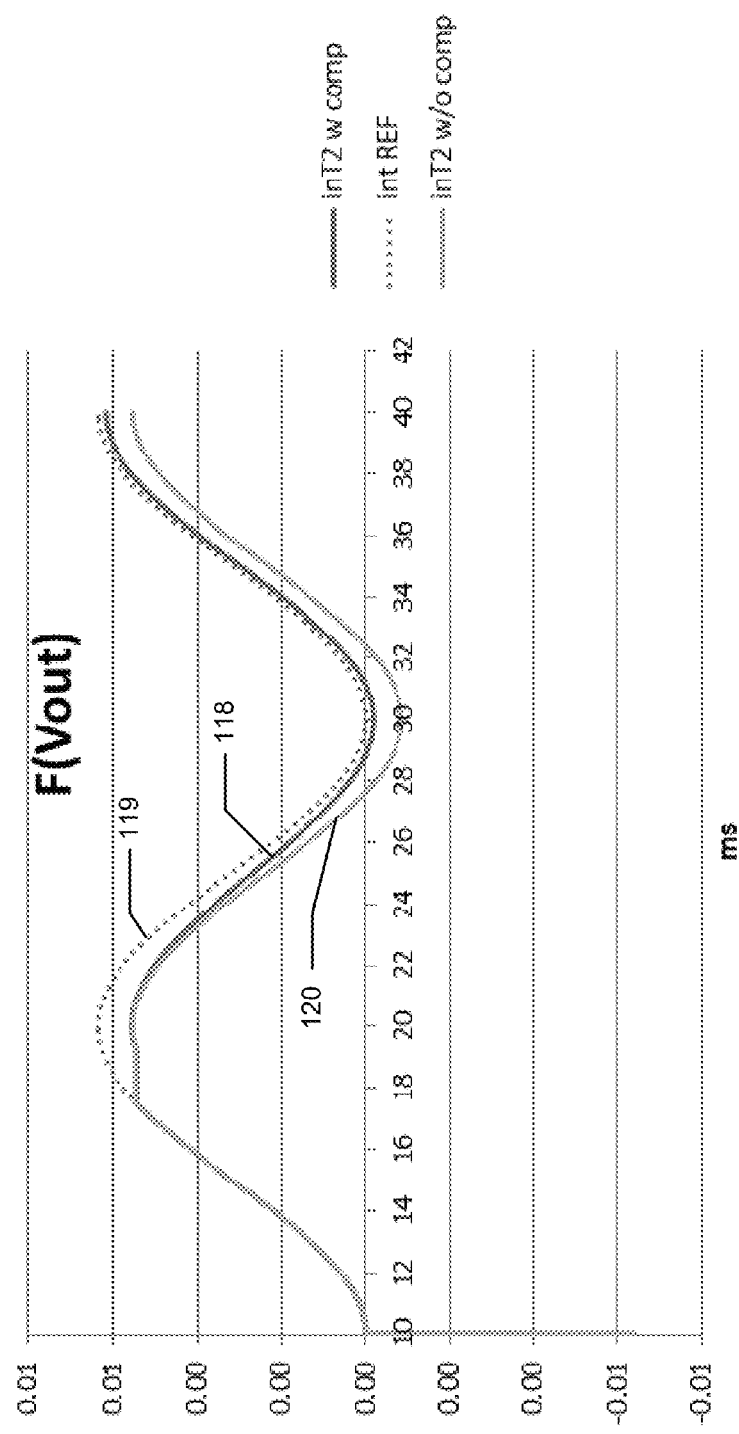
FIG. 8, which is always proportional to the voltage in FIG. 7 integral, shows compensation being applied by the intelligent transfer algorithm for the under voltage condition shown in FIG. 7, with a portion of the correction being applied after the zero crossing during the next half cycle.

FIG. 7 shows an example where the under voltage failure condition occurs at a time instant where the intelligent algorithm is not able to determine and fully apply the voltage area compensation before the first zero crossing. In this instance waveform 114, representing Vout, shows a failure at point 116. Cross hatched portion 115 is the under voltage area requiring compensation. However, this is too close to the zero crossing (point 117) for the compensation to be calculated and applied by the method using the intelligent transfer algorithm. FIG. 8 shows a Vout waveform 118 processed by a microprocessor of the UPS (see above) with the compensation having been applied. Waveform 120 represents what the Vout voltage area would have been without correction. The waveform 118 with voltage compensation applied closely tracks waveform 119, which is the internal reference voltage. The internal reference voltage equals $F(V_{out\ reference})$ was the abbreviation of $\int V_{out}$, but this is not corrected as $F(V_{out})$ is proportional to $\int V_{out}$.

Figure 9:
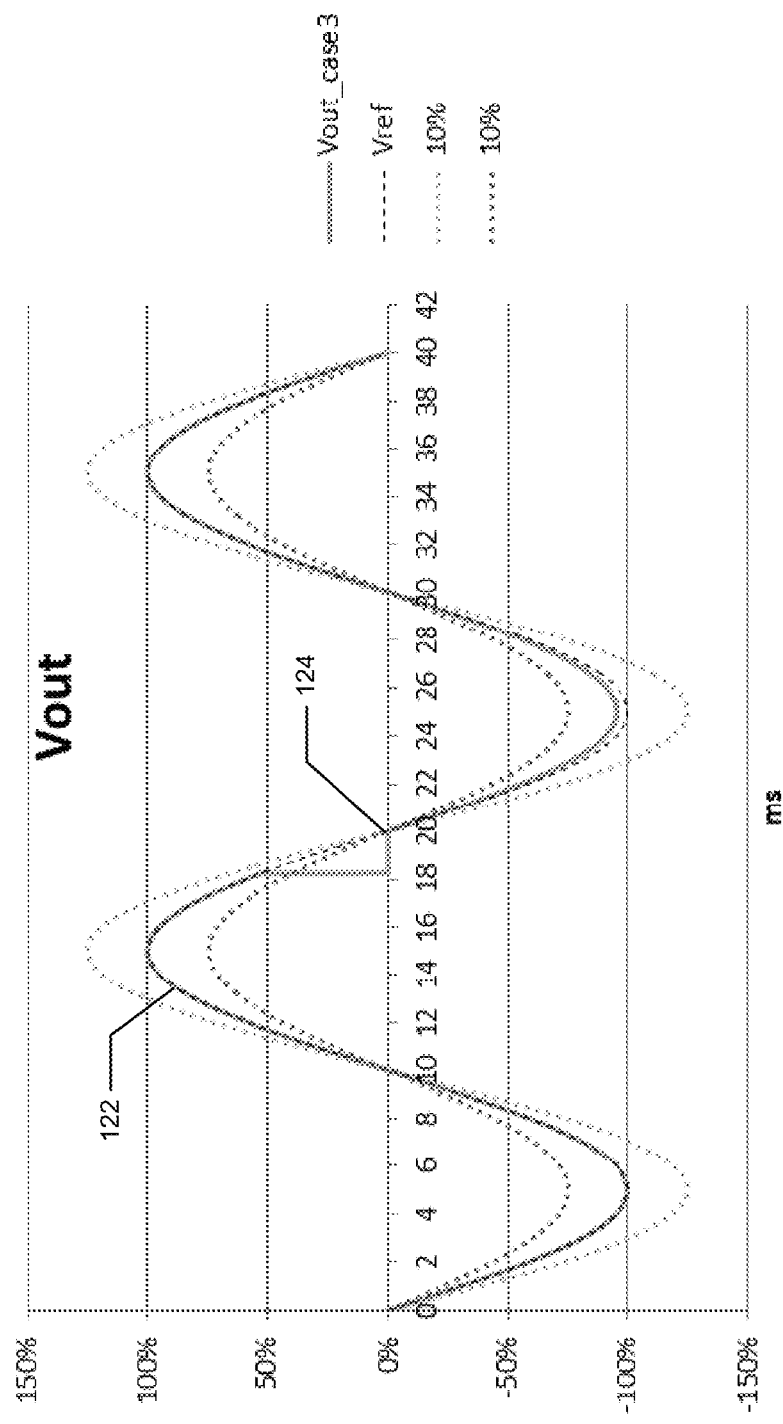
FIG. 9 shows another example where it is not necessary to apply the voltage area correction when a failure is detected.
Figure 10:
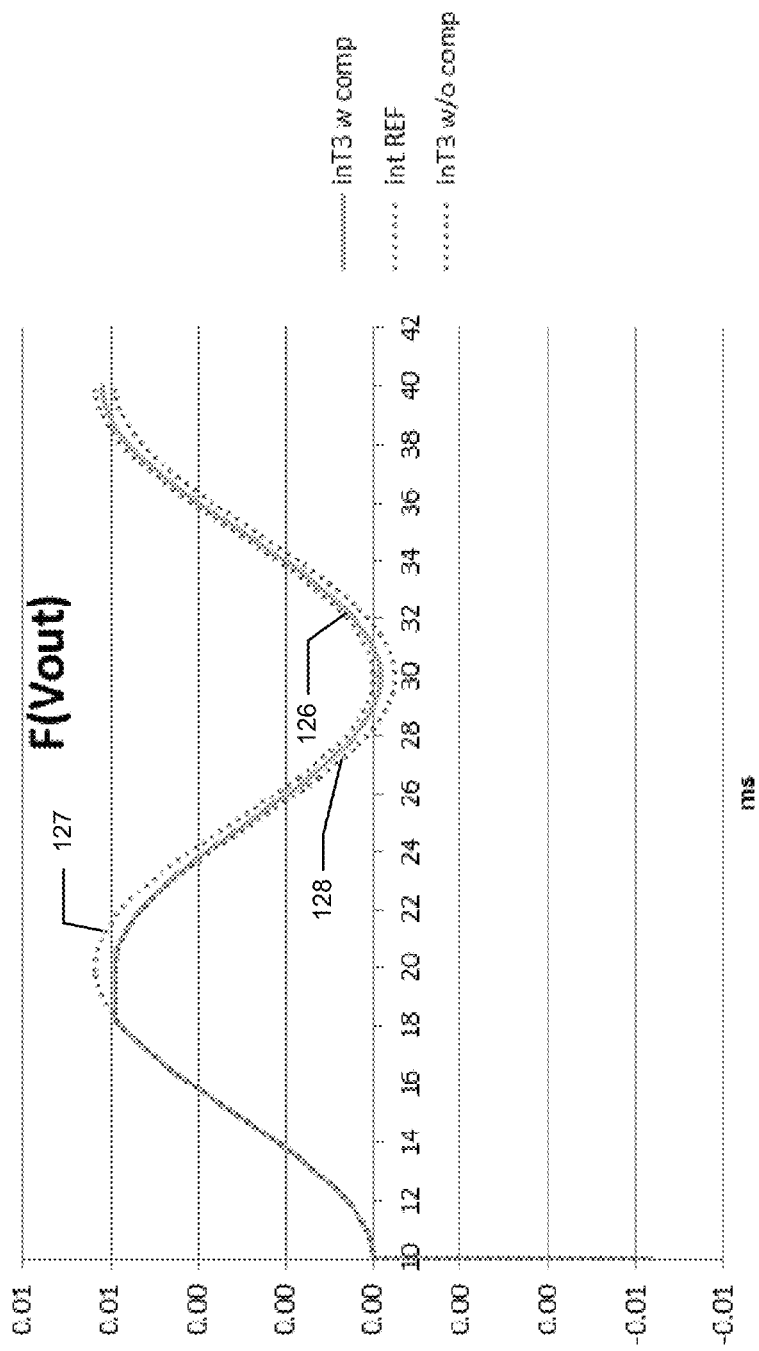
FIG. 10, which is the voltage area of FIG. 9, shows that for the failure condition of FIG. 9, the voltage area compensation having been applied does not tangibly change the waveform relative to the internal reference voltage signal.

FIG. 9 illustrates the condition where it is not necessary to apply the correction. In this example waveform 122 is very close to the zero crossing point (i.e., at point 124) when the low impedance condition arises, so the amount of correction that would be needed falls within the allowable +15% threshold that the transformer design can tolerate before being carried into saturation, and therefore no correction is required. FIG. 10 shows Vout as waveform 126, and waveform 128 represents what Vout would be without compensation. Waveform 127 represents the internal reference voltage.

Figure 11:
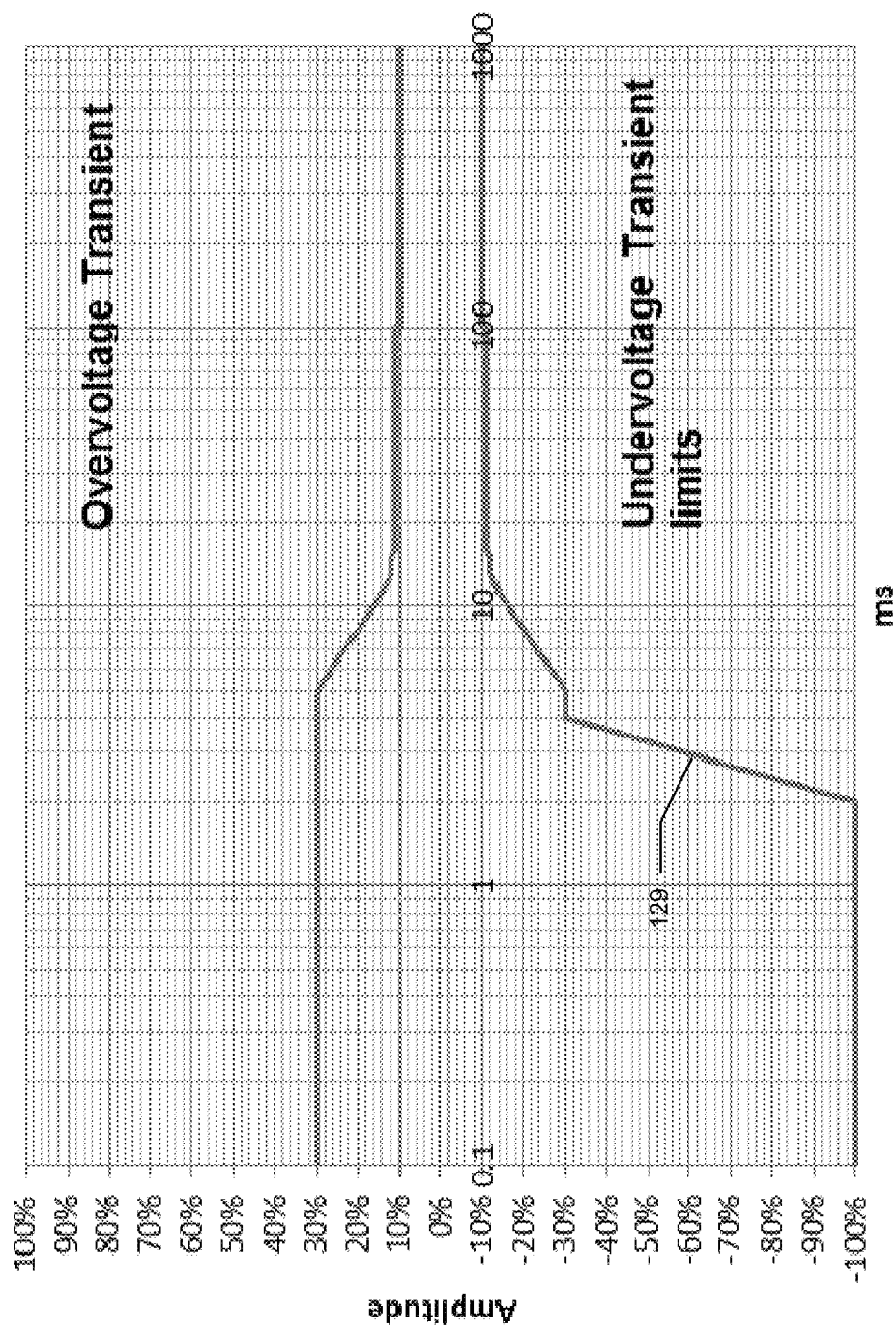
FIG. 11 shows a graph to illustrate how the intelligent transfer algorithm is able to keep Vout within the limits required (AC voltage envelope).

FIG. 11 shows waveform 129 illustrating how the voltage area compensation is able to keep Vout within the limits required by critical loads.

In FIGS. 11*a*-11*c* three additional examples are shown of how the voltage area compensation of the present disclosure may be applied by the method using the intelligent algorithm. In FIG. 11*a* the missing voltage area 130 has been determined to be about 25%. Since we assume a 15% threshold below which the transformer will not be adversely affected, the amount of missing voltage area to be added by correction is 10% (25%–15%=10%). In this example 5% of the voltage area correction is applied before the first zero crossing (point 133) is reached (portion 132), and the remaining 5% of the correction (portion 134) is applied in the first half cycle after the zero crossing. In FIG. 11*b* the missing voltage area (136) is determined to be 19%, so the percentage of voltage area correction to be implemented is 4% (19%–15% threshold=4% correction). In this example only 1% of the correction (portion 138) is able to be applied before the zero crossing (point 140) is reached, so the remaining 3% (portion 142) is applied in the next half cycle. FIG. 11*c* illustrates the missing voltage area 144 as being 6%. Since this is less than the 15% threshold, no voltage correction needs to be performed.

Figure 12:
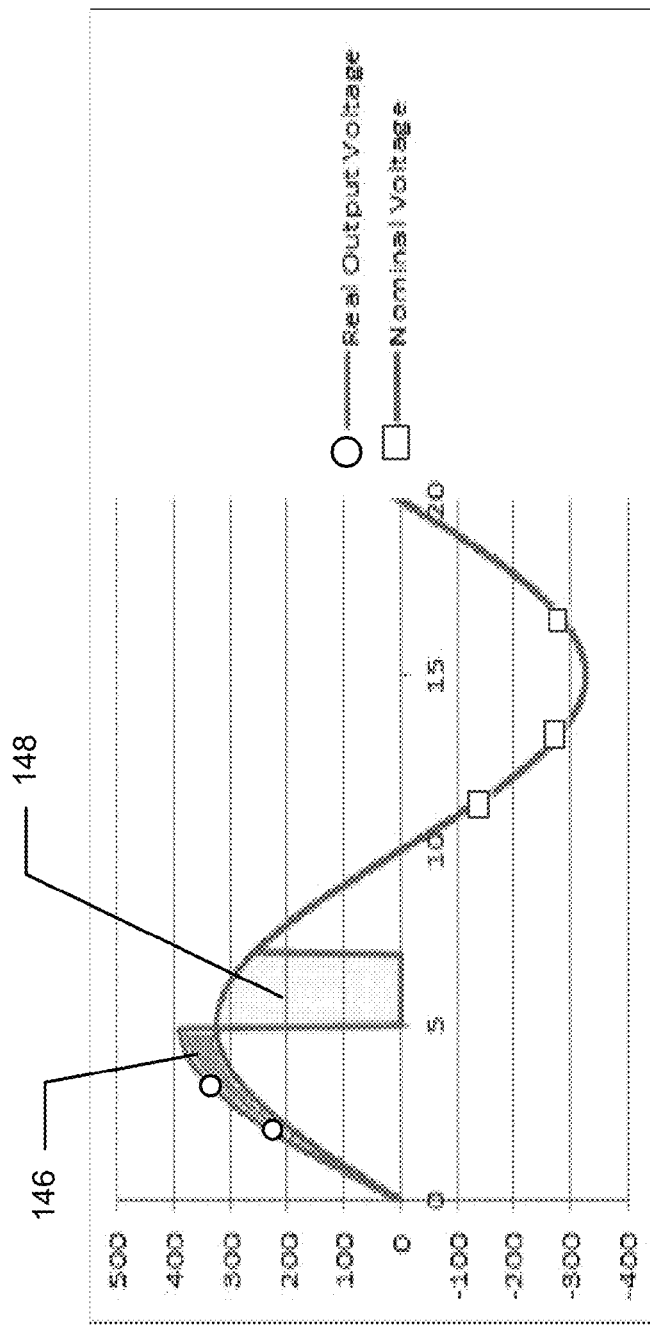
FIG. 12 illustrates the situation where the real output voltage was greater than the nominal voltage before the failure, thus requiring the amount of voltage area compensation to be reduced by the percentage that the real output voltage exceeds the nominal voltage.
Figure 13:
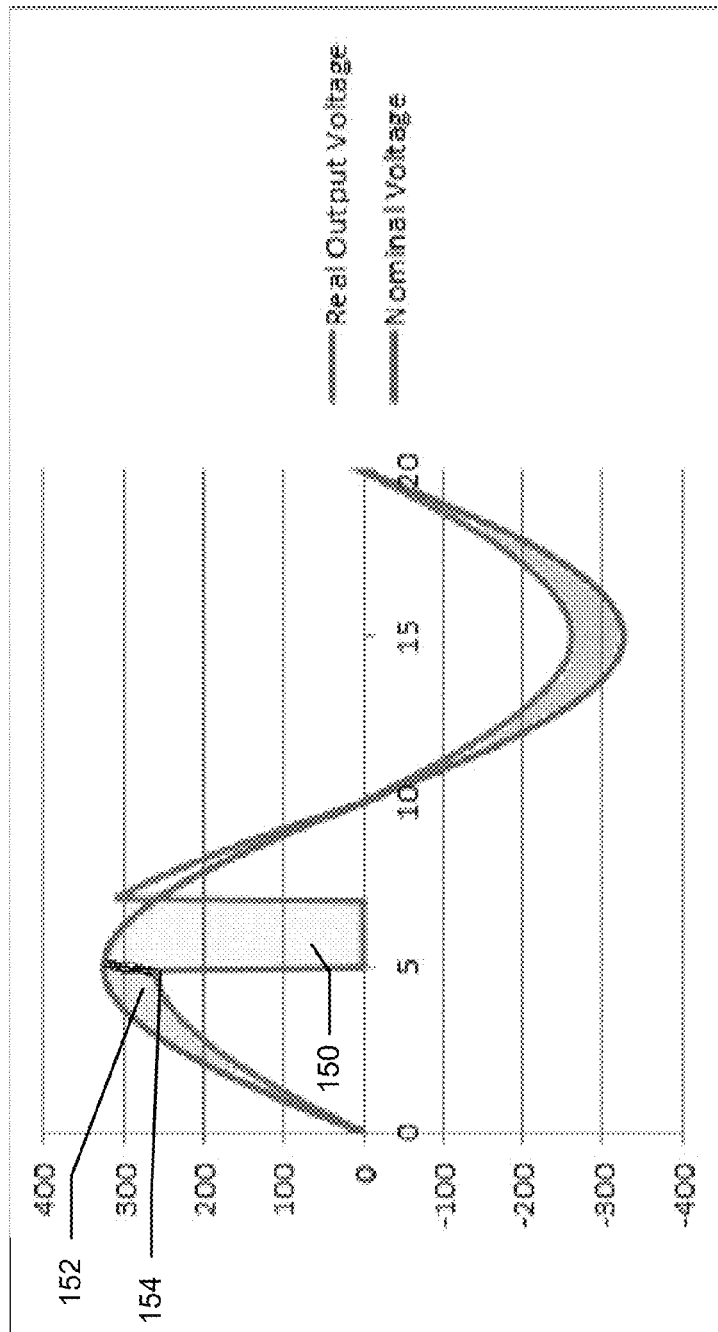
FIG. 13 illustrates the situation where the real output voltage was less than the nominal output voltage before the failure, which requires the voltage area compensation determined to be increased by the percentage of the "under voltage" of the real voltage relative to the nominal voltage.

FIGS. 12 and 13 show still further examples of the voltage correction applied by the method of the present disclosure using the intelligent algorithm. In FIG. 12 the real output voltage is represented by waveform 146 and the missing voltage area, 20%, is represented by portion 148. So the voltage area correction to be applied would normally be 5% (20%–15% threshold=5%). But in this example the real output voltage 146, before the failure, was exceeding the nominal voltage by 5%. In this instance no compensation is required. Put differently, the amount by which the actual voltage exceeds the nominal voltage from the zero crossing to right before the time of the failure may be taken into account to offset the amount of voltage area correction that would otherwise be calculated. So in this example the 5% by which the actual area voltage exceeded the nominal voltage area at the time of the failure fully offsets the 5% voltage area correction that would have otherwise been applied.

FIG. 13 shows the opposite scenario: the actual missing voltage area 150 is about 20%. So with a threshold of 15%, this means that 5% voltage area compensation would ordinarily be in order. But since the actual (i.e., "real") voltage area is less than the nominal voltage area by about 4% (as represented by voltage area 152) when the failure occurs (at T=5 ms), as denoted by point 154, this percentage is added to the determined voltage area correction. So the total voltage area correction is 9% (5%+4%=9%).

Use with Static Transfer Switch (STS)

The intelligent transfer algorithm thus permits the integration of a load upstream transformer with a UPS. The intelligent transfer algorithm has been extended to accommodate the presence of STSs. The challenge here is that STSs are able to commutate between two sources with their own voltage windows. As such, the possibility arises that the STS may communicate with both voltage sources before the STS fully transitions from one voltage source to the other. The method of the present disclosure uses the intelligent transfer algorithm to address the interaction between the UPS and the STS by adding adaptive thresholds fixed at the beginning of a low impedance event, for example at a typical value of 15%, which considers the voltage area between the Vout curve and the X axis. These thresholds are applied independently on the three phases, and the method corrects the phase which exceeds this 15% value, and checks the other phases recursively. And while the description in the present application is based on the hypothesis that the voltage area compensation can be applied independently on each phase (to simplify the following description), typical of a star (Y) transformer, other power distribution arrangements may also be accommodated (e.g. Delta connection with or without a neutral connection). Furthermore, while the threshold of 15% has been used for the foregoing examples, it will be appreciated that this value can be varied as needed. The 15% value, for example, can be fixed at 15% at the first power on of the UPS unit, and then recalculated based on the load information extracted by a control system of the UPS. Therefore the present disclosure is not limited to use with only a 15% threshold.

It is important to highlight that the transformer upstream of the load, and its 15% tolerance figure, is typically a value that comes from experience, but can be quite different, so it is important to estimate this value during operation of the UPS. But in one embodiment of the present disclosure, the methodology allows about a 15% tolerance on the voltage applied on the primary side of the transformer before saturation of the core occurs. Thus, a low impedance event that causes a drop in Vout of less than this 15% margin does not require compensation to be applied by the intelligent transfer algorithm. If and when the variation exceeds 15%, such a point will define the starting threshold at which the intelligent transfer algorithm may begin applying a needed correction. The threshold has another scope: when a STS is fitted upstream of the load, it permits the generation of a compatible wave form with its transfer window. Put differently, mathematically, the missing area should be fully compensated for, but it is still important that when applying the voltage compensation after turning on the inverter, that one does not exceed the input voltage allowed windows of the STS. Basically the threshold permits the UPS to generate a lesser degree of compensation. This is not only a function of the magnetic characteristics (max input voltage), but it is a dynamic (time variant) function of V/Hz ratio, recalculated at each failure.

Figure 14:
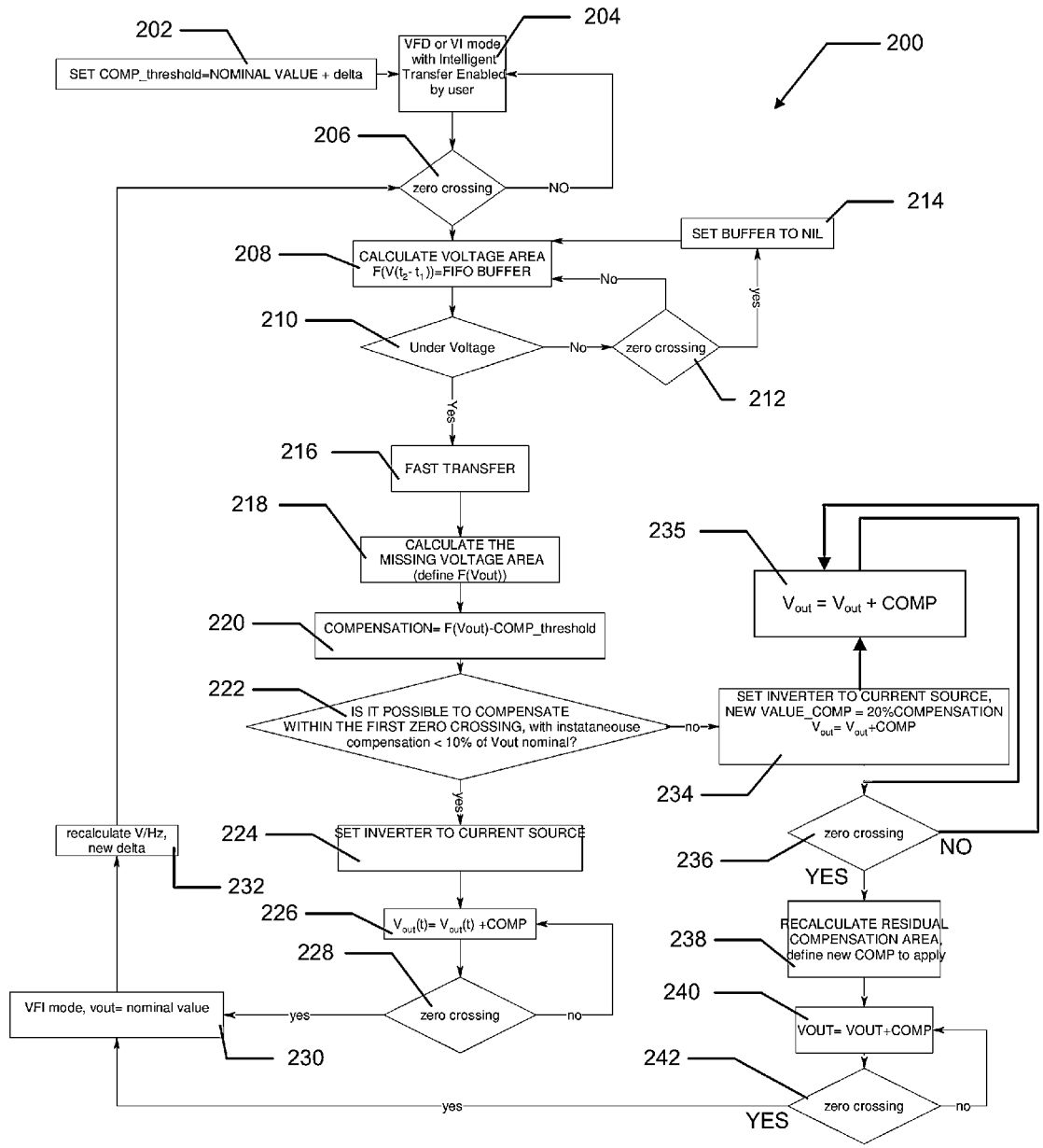
FIG. 14 is a flowchart illustrating various operations that may be performed by the method of the present disclosure in implementing the intelligent transfer algorithm to compensate for an under voltage condition that arises on the bypass line of a UPS.

FIG. 14 is a flowchart 200 showing operations that may be performed by the intelligent transfer algorithm of the present disclosure. At operation 202 the compensation threshold is set equal to NOMINAL VALUE=15% (this is the threshold described above)+delta, and "delta" in this example is at the unit startup set to zero and adjusted while evaluating the load response at voltage variation. However, as noted above, the 15% figure is just one example. At operation 204, the VFD or VI (input dependent modes) with use of the intelligent transfer algorithm are enabled. At operation 206 the method senses for the presence of a zero crossing. If no zero crossing is detected, then operation 204 is repeated. If the zero crossing is detected, then F(V(t2−t1)) is determined and this value is placed in a FIFO buffer, as indicated at operation 208. It will be understood that the FIFO buffer had previously been reset to zero. Essentially, the values for F(V(t2−t1)) are summed for each half cycle in the FIFO buffer, and if no under voltage condition is detected during that particular half cycle, then the FIFO buffer is reset when the next zero crossing point is reached.

If an under voltage condition is detected at operation 210, then the intelligent fast transfer algorithm is initiated, as indicated at operation 216. At operation 218 the missing voltage area (F(Vout)) is calculated. At operation 220 the required voltage area compensation is determined. At operation 222*a* determination is made if it is possible to apply the full degree of the determined voltage area compensation before the first zero crossing (i.e., the next upcoming zero crossing), while insuring that the instantaneous voltage that is applied to implement the voltage area compensation does not exceed 10% of Vout nominal. If this can be accomplished, then at operation 224 the inverter of the UPS is set to "current source." At operation 226, Vout(t) begins implementing the newly calculated voltage area compensation. At operation 228 another check is then made if the next zero crossing point has been reached. If it has not, then operation 226 is repeated.

When the check at operation 228 indicates that the zero crossing has been reached, then VFI mode (i.e., UPS powering the load) is entered and vout (voltage output being supplied by the UPS) is set equal to Vnominal. At operation 232 the method then recalculates V/hz and a new delta.

If the check at operation 222 indicated that it was not possible to apply the voltage area compensation by the time the next zero crossing is reached, then the inverter of the UPS is set to "current source", and NEW VALUE_COMP is set equal to 20% compensation as indicated at operation 234. By this operation the calculated voltage area compensation is limited to 20% of the total voltage area compensation that was calculated at operation 220. At operation 235 $V_{out}$ is set equal to $V_{out}$+COMP. At operation 236 another check is made if the zero crossing is reached. If not, operation 235 is repeated. If so, then at operation 238 the residual voltage area compensation is recalculated to define the new amount of voltage area compensation to apply. At operation 240 the VOUT is set equal to VOUT+COMP, meaning that the output from the UPS is set to apply the needed remaining percentage of voltage area compensation. At operation 242 another check is made if the zero crossing has been reached. If not, then operation 240 is repeated. If it has been reached, then operations 230 and 232 are repeated.

The method of the present disclosure and its implementation of the intelligent transfer algorithm enables operation in high efficiency modes VI or VFD in the presence of complex data center structure such as transformers and STSs upstream of the load but downstream of the UPS, that would otherwise significantly affect the voltage applied to the load in the event of an under voltage condition requiring a mode transfer to the VFI mode of operation by a UPS. The method helps to reduce or eliminate the in-rush current that would otherwise occur if a transformer was located upstream of the load and downstream of the UPS. The method further considers the interaction between the STS, the UPS and the magnetics present when complex components are located upstream of the load. The overall reliability of the UPS is increased permitting the UPS to operate in input dependent mode when the installation includes such complex components such as transformers and STS switches.

While FIGS. 5-13 are examples of the operation of the intelligent algorithm based on a star (Y) distribution line, the same results may be achieved on virtually any form of distribution line. Furthermore, it will be appreciated that the operations described in connection with FIGS. 5-14 may be implemented independently on each phase of a multi-phase power system.

It will also be appreciated that the system and method of the present disclosure may also be used in cases where UPSs are used with no bypass line installed. In such a case, for example, if a switch downstream of the UPS, but upstream of the primary side of a transformer, is suddenly closed, there would typically be an in-rush of current through the transformer. The inverter would become overloaded and the output voltage would drop. When the output voltage comes back up to within reference limits, the intelligent mode may then be activated and voltage compensation as described herein may then be applied. Obviously, in such a case, no transfer is needed due.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for detecting and compensating for an under voltage fault condition which arises when a low impedance fault occurs on a bypass line of an uninterruptible power supply (UPS) as a result of a disruption of an AC output mains (Vout) signal present on the bypass line, which reduces the Vout signal below a nominal AC mains voltage output ($Vout_{nominal}$), and wherein a component is disposed downstream of the UPS and receives power from the UPS as a changeover is made from a high efficiency mode of operation to a voltage/frequency independent (VFI) mode in which the UPS is supplying power to a load, and the component is upstream of the load but downstream of the UPS, the method comprising:

performing successive voltage measurements at a plurality of points during a first half cycle of the Vout signal to integrate the Vout signal until a zero crossing of the Vout signal is detected;

using the successive voltage measurements to detect the disruption of the Vout signal and a percentage representing a missing voltage from the Vout signal during the disruption;

using the UPS to supply a compensation voltage (Vcomp) which is added to the Vout signal to restore the Vout signal to a level at least approximately equal to $Vout_{nominal}$; and further comprising determining when Vout cannot be restored to $Vout_{nominal}$ by adding a predetermined maximum level for Vcomp before a next zero crossing point will occur, and adding a first portion of Vcomp before said next zero crossing occurs, and a second portion of Vcomp after said next zero crossing has passed.

2. The method of claim 1, further comprising setting a predetermined percentage voltage compensation threshold relating to a percentage of voltage that is lost during the disruption of the Vout signal, and below which no action will be taken to compensate for the disruption of the Vout signal.

3. The method of claim 2, further comprising determining if the percentage of voltage that is lost from the Vout signal during the disruption has resulted in a percentage of voltage lost from the Vout signal that exceeds the predetermined percentage voltage compensation threshold, and only then using the UPS to supply the compensation voltage (Vcomp).

4. The method of claim 3, wherein the predetermined maximum level for Vcomp represents a maximum level for Vcomp that is allowed to be applied during any given half cycle of the Vout signal.

5. The method of claim 4, wherein the maximum level for the Vcomp corresponds to a maximum predetermined percentage of $Vout_{nominal}$.

6. A method for detecting and compensating for an under voltage fault condition which arises when a low impedance fault occurs on a bypass line of an uninterruptible power supply (UPS) as a result of a disruption of an AC output mains (Vout) signal present on the bypass line, which reduces the Vout signal below a nominal AC mains voltage output ($Vout_{nominal}$), and wherein a component is disposed downstream of the UPS and receives power from the UPS as a changeover is made from a high efficiency mode of operation to a voltage/frequency independent (VFI) mode in which the UPS is supplying power to a load, and the component is upstream of the load but downstream of the UPS, the method comprising:
  setting a predetermined percentage voltage compensation threshold relating to a percentage of voltage that is lost during the disruption of the Vout signal, and below which no action will be taken to compensate for the disruption;
  performing successive voltage measurements at a plurality of points during a first half cycle of the Vout signal to integrate the Vout signal until a zero crossing of the Vout signal is detected;
  using the successive voltage measurements to detect the disruption of the Vout signal and a percentage representing the missing voltage from the Vout signal during the disruption;
  determining if the percentage of missing voltage from the Vout signal during the disruption has resulted in a percentage of voltage lost from the Vout signal that exceeds the predetermined percentage voltage compensation threshold, and then:
  using the UPS to supply a compensation voltage (Vcomp) which is added to the Vout signal to the Vout signal to a level at least approximately equal to $Vout_{nominal}$; and
  further comprising determining when Vout cannot be restored to $Vout_{nominal}$ by adding a predetermined maximum level for Vcomp before a next zero crossing point will occur, and adding a first portion of Vcomp before said next zero crossing occurs, and a second portion of Vcomp after said next zero crossing has passed.

7. The method of claim 6, wherein the predetermined maximum level for Vcomp represents a maximum level for Vcomp that is allowed to be applied during any given half cycle of the Vout signal.

8. The method of claim 7, wherein the maximum level for Vcomp corresponds to a maximum predetermined percentage of $Vout_{nominal}$.

9. The method of claim 6, further comprising determining when Vout cannot be restored to $Vout_{nominal}$ by adding the predetermined maximum level for Vcomp before a next zero crossing will occur, and further determining if adding a first portion of Vcomp before the next zero crossing occurs would only allow for adding a percentage amount of Vcomp that is less than or equal to the predetermined percentage voltage compensation threshold.

10. The method of claim 9, when determining that adding a first portion of Vcomp before the next zero crossing occurs would only allow for adding a percentage amount of Vcomp that is less than or equal to the predetermined percentage voltage compensation threshold, then applying no portion of Vcomp before the next zero crossing occurs.

11. A system having an intelligent transfer algorithm to detect and compensate for an under voltage fault condition which arises when a low impedance fault occurs on a bypass line of an uninterruptible power supply (UPS) as a result of a disruption of an AC output mains (Vout) signal present on the bypass line, which reduces the Vout signal below a nominal AC mains voltage output ($Vout_{nominal}$), and wherein a component is disposed downstream of the UPS and receives power from the UPS as a changeover is made from a high efficiency mode of operation to a voltage/frequency independent (VFI) mode in which the UPS is supplying power to a load, and the component is upstream of the load but downstream of the UPS, the system comprising:
  a UPS on which the intelligent transfer algorithm is running, the UPS configured to:
    perform successive voltage measurements at a plurality of points during a first half cycle of the Vout signal to integrate the Vout signal until a zero crossing of the Vout signal is detected;
    use the successive voltage measurements to detect the disruption of the Vout signal and a percentage representing a missing voltage area from the Vout signal during the disruption;
    use the UPS to supply a compensation voltage (Vcomp) which is added to the Vout signal to restore the Vout signal to a level at least approximately equal to $Vout_{nominal}$; and
  wherein the UPS is further configured to determine when Vout cannot be restored to $Vout_{nominal}$ by adding a full amount of Vcomp before a next zero crossing point will occur, and operates to add a first portion of Vcomp before said next zero crossing occurs, and a second portion of Vcomp after said next zero crossing has passed.

12. The system of claim 11, wherein the UPS makes use of a predetermined percentage voltage compensation threshold relating to the percentage of voltage that is lost during the disruption of the Vout signal, and below which no action will be taken to compensate for the disruption.

13. The system of claim 11, wherein the UPS makes use of a maximum level for Vcomp that is allowed to be applied during any given half cycle of the Vout signal.

14. The system of claim 13, wherein the maximum level for Vcomp corresponds to a maximum predetermined percentage of $Vout_{nominal}$.

15. The system of claim 12, wherein the UPS is further configured to determine when Vout cannot be restored to $Vout_{nominal}$ by adding the maximum level for Vcomp before a next zero crossing will occur, and further operates to determine when adding a first portion of Vcomp before the next zero crossing occurs would only allow for adding a percentage amount of Vcomp that is less than or equal to the predetermined percentage voltage compensation threshold, and then takes no action to correct for a reduction of Vout.

16. The system of claim 14, wherein the UPS is configured such that the maximum predetermined percentage of $Vout_{nominal}$ is set to 10%.

17. The system of claim 12, wherein the UPS is set such that the predetermined percentage voltage compensation threshold comprises a threshold of about 15% of Vout.

* * * * *